(12) United States Patent
Jun et al.

(10) Patent No.: US 10,979,652 B1
(45) Date of Patent: Apr. 13, 2021

(54) CAMERA MODULE WITH A PLURALITY OF CAMERAS BOTH FIXED AND MOVABLE RELATIVE TO A BASE PLATE AND ELECTRONIC DEVICE INCLUDING SAID CAMERA MODULE

(71) Applicant: Samsung Electro-Mechanics Co., Ltd., Suwon-si (KR)

(72) Inventors: Jae Woo Jun, Suwon-si (KR); Chul Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/923,411

(22) Filed: Jul. 8, 2020

(30) Foreign Application Priority Data

Feb. 20, 2020  (KR) .................. 10-2020-0021261

(51) Int. Cl.
*H04N 5/225* (2006.01)
*H04N 5/247* (2006.01)
*H04N 5/232* (2006.01)

(52) U.S. Cl.
CPC .......... *H04N 5/247* (2013.01); *H04N 5/2254* (2013.01); *H04N 5/2257* (2013.01); *H04N 5/23299* (2018.08)

(58) Field of Classification Search
CPC .................................................. H04N 5/23299
See application file for complete search history.

(56) References Cited

U.S. PATENT DOCUMENTS

| | | | |
|---|---|---|---|
| 9,442,363 B2* | 9/2016 | Seo | H04N 13/239 |
| 9,743,067 B2* | 8/2017 | Geris | H04N 13/239 |
| 2008/0225129 A1* | 9/2008 | Viinikanoja | H04N 13/239 |
| | | | 348/218.1 |
| 2010/0194860 A1* | 8/2010 | Mentz | H04M 1/0264 |
| | | | 348/47 |
| 2011/0157377 A1* | 6/2011 | Chang | H04N 13/296 |
| | | | 348/207.99 |

FOREIGN PATENT DOCUMENTS

| | | |
|---|---|---|
| KR | 10-2006-0073745 A | 6/2006 |
| KR | 10-2017-0057058 A | 5/2017 |

* cited by examiner

*Primary Examiner* — Gary C Vieaux
(74) *Attorney, Agent, or Firm* — NSIP Law

(57) ABSTRACT

A camera module includes: a base plate; and a plurality of cameras disposed on the base plate and spaced apart from one another. The plurality of cameras include: fixed cameras that are immovable with respect to the base plate; and movable cameras that are each configured to move with respect to the base plate and rotate around a fixed camera among the fixed cameras.

18 Claims, 32 Drawing Sheets

CAMERA MODULE WITH A PLURALITY OF CAMERAS BOTH FIXED AND MOVABLE RELATIVE TO A BASE PLATE AND ELECTRONIC DEVICE INCLUDING SAID CAMERA MODULE

CROSS-REFERENCE TO RELATED APPLICATIONS

This application claims the benefit under 35 U.S.C. § 119(a) of Korean Patent Application No. 10-2020-0021261 filed on Feb. 20, 2020 in the Korean Intellectual Property Office, the entire disclosure of which is incorporated herein by reference for all purposes.

BACKGROUND

1. Field

The following description relates to a camera module and a portable electronic device including a camera module.

2. Description of Related Art

A portable terminal device such as a tablet PC, a laptop, or the like, as well as a smartphone, may include a camera. Also, a structure for disposing a plurality of cameras, rather than a single camera, in a portable electronic device has been suggested to obtain various effects that may be difficult to be implemented with a single camera.

However, even when a plurality of cameras are disposed in a portable electronic device, there may be a limitation in implementing various effects because positions of the plurality of cameras are fixed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a base plate; and a plurality of cameras disposed on the base plate and spaced apart from one another. The plurality of cameras include: fixed cameras that are immovable with respect to the base plate; and movable cameras that are each configured to move with respect to the base plate and rotate around a fixed camera among the fixed cameras.

The movable cameras may each be further configured to move such that a distance between the movable cameras increases or decreases.

The movable cameras may each be further configured to move between a respective first position and a respective second position, and wherein the respective first position is a position in which centers of all of the plurality of cameras are linearly aligned, and the respective second position is a position in which a path connecting centers of adjacent cameras among the plurality of cameras forms a quadrangular shape.

The fixed cameras may include a first camera and a second camera, and the movable cameras may include a third camera and a fourth camera. The third camera may be disposed adjacent to the first camera, and the fourth camera may be disposed adjacent to the second camera.

The base plate may include guide holes penetrating the base plate and configured to be arc-shaped. Each of the third camera and the fourth camera may include a protrusion disposed in a corresponding guide hole among the guide holes. The third camera may be configured to rotate around the first camera, and the fourth camera may be configured to rotate around the second camera.

The base plate may further include guide rails spaced apart from the guide holes and configured to be arc-shaped. Each of the third camera and the fourth camera may further include a guide projection disposed in a corresponding guide rail among the guide rails.

A curvature of each of the guide holes may be different from a curvature of each of the guide rails.

Each of the third camera and the fourth camera may further include an image sensor having a rectangular shape. Each of the third camera and the fourth camera may be movable such that a long side of the image sensor in the respective first position is parallel to a long side of the image sensor in the respective second position. The respective first position may be a position in which centers of the first to fourth cameras are linearly aligned. The respective second position may be a position in which a path connecting centers of adjacent cameras among the first to fourth cameras forms a quadrangular shape.

A curvature of each of the guide holes may be the same as a curvature of each of the guide rails.

Each of the third camera and the fourth camera may further include an image sensor having a rectangular shape. Each of the third camera and the fourth camera may be movable such that a long side of the image sensor in the respective first position is perpendicular to a long side of the image sensor in the respective second position. The respective first position may be a position in which centers of the first to fourth cameras are linearly aligned. The respective second position may be a position in which a path connecting centers of adjacent cameras among the first to fourth cameras forms a quadrangular shape.

The first camera and the third camera may be connected to each other by a first link member. The second camera and the fourth camera may be connected to each other by a second link member.

The base plate may include a driver including a rotating shaft, a first gear, and a second gear. The first gear may be configured to rotate while engaged with the rotating shaft. The second gear may be configured to rotate while engaged with the first gear. One end of the first link member may be engaged with the first gear, and one end of the second link member may be engaged with the second gear.

In another general aspect, an electronic device includes: a case and a cover coupled to each other, and forming an internal space; and a camera module disposed in the internal space. The camera module includes: a base plate; and a first camera, a second camera, a third camera, and a fourth camera spaced apart from one another. The first camera and the second camera are fixed to the base plate and immovable with respect to the base plate. The third camera is configured to move with respect to the base plate and rotate around the first camera. The fourth camera is configured to move with respect to the base plate and rotate around the second camera.

The first camera, the second camera, the third camera, and the fourth camera may be configured to have different fields of view.

The electronic device may further include: infrared blocking filters disposed on the cover in positions corresponding to fixed positions of the first and second cameras and respective first positions of the third and fourth cameras; and infrared passing filters disposed on the cover in positions corresponding to respective second positions of the third and fourth cameras. The respective first positions may be positions in which centers of the first to fourth cameras are linearly aligned, and the respective second positions may be positions in which a path connecting centers of adjacent cameras among the first to fourth cameras forms a quadrangular shape.

The cover may include: first stops disposed in positions corresponding to fixed positions of the first and second cameras and respective first positions of the third and fourth cameras; and second stops disposed in positions corresponding to respective second positions of the third and fourth cameras. Diameters of the first stops may be different from each other, and diameters of the second stops may be different from the diameters of the first stops. The respective first positions may be positions in which centers of the first to fourth cameras are linearly aligned, and the respective second positions may be positions in which a path connecting centers of adjacent cameras among the first to fourth cameras forms a quadrangular shape.

The base plate may include guide holes having a curved shape. The third and fourth cameras may each include a protrusion disposed in a respective guide hole among the guide holes.

The third camera may be connected to the first camera by a first link member, and the fourth camera may be connected to the second camera by a second link member.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
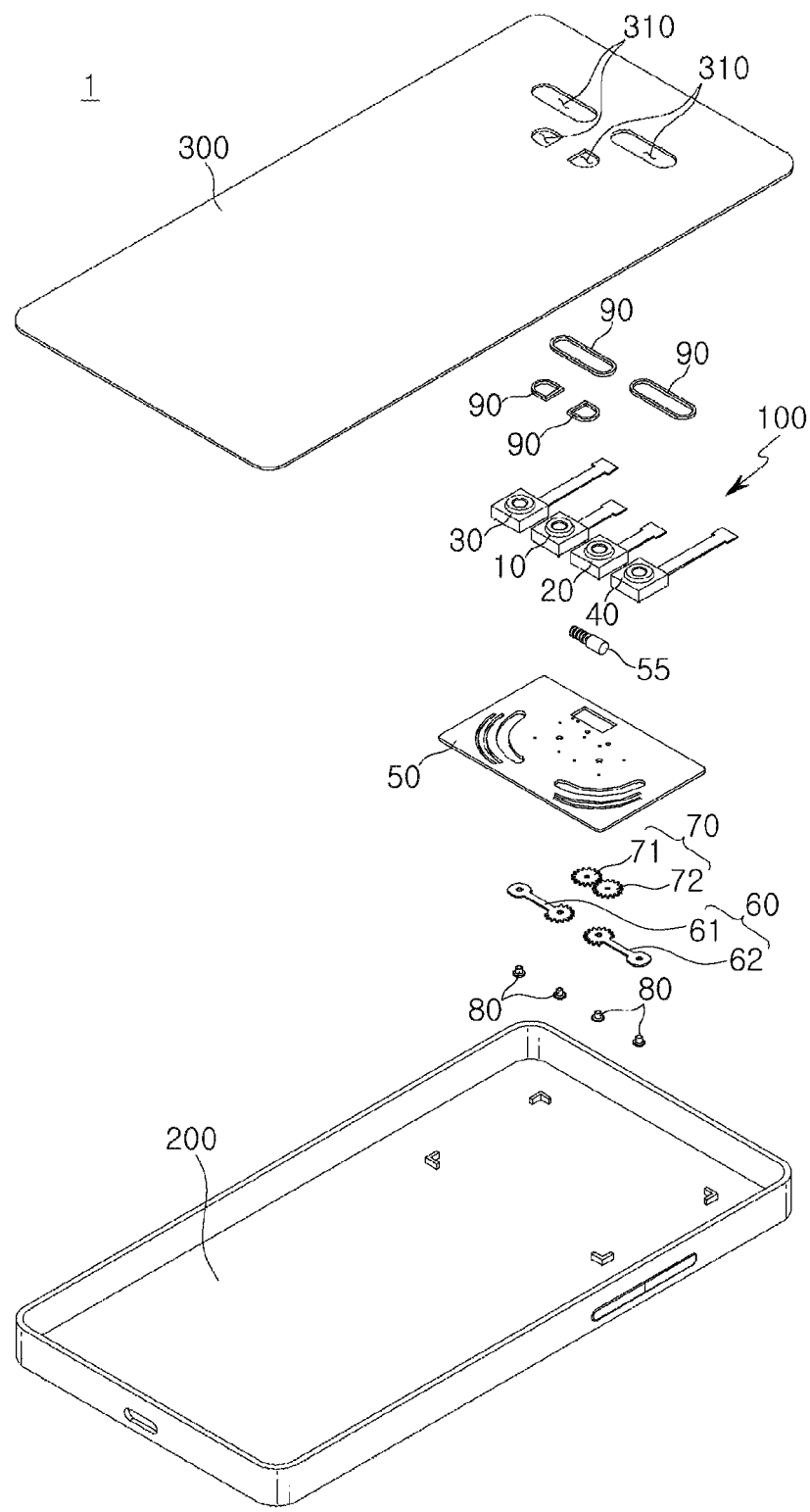
FIG. 1 is an exploded perspective view illustrating a portable electronic device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," "front," "rear," and "side" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. For another example, if the device in the figures is turned around, an element described as being "front" relative to another element will then be "rear" relative to the other element. Thus, the term "front" encompasses both the front and rear orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
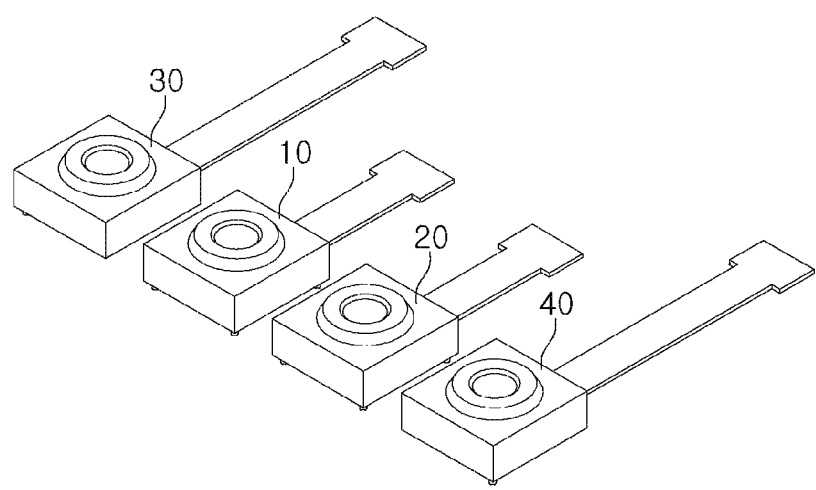
FIG. 2 is a perspective view illustrating a first camera, a second camera, a third camera, and a fourth camera, according to an embodiment.
Figure 3:
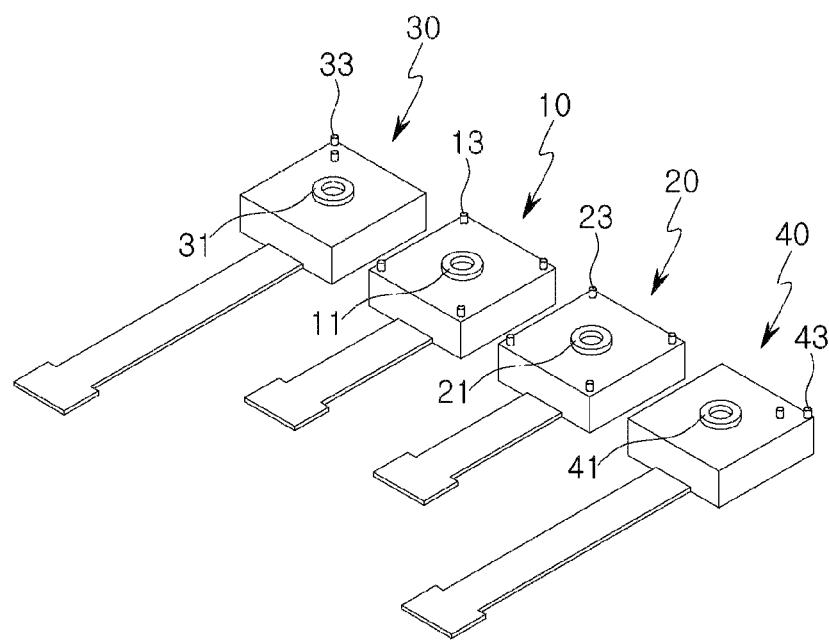
FIG. 3 is a bottom perspective view illustrating the first camera, the second camera, the third camera, and the fourth camera.
Figure 4:
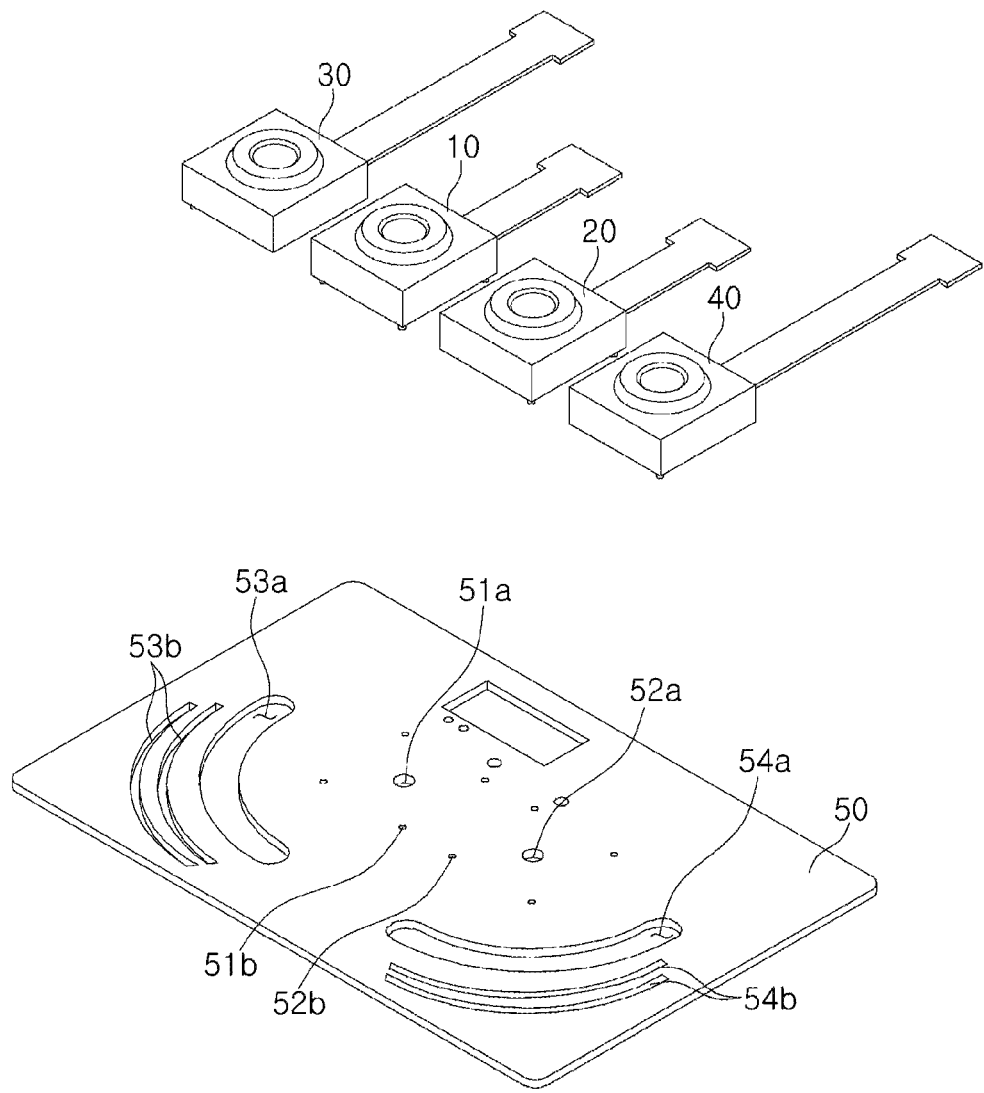
FIG. 4 is an exploded perspective view illustrating the first camera, the second camera, the third camera, the fourth camera, and a base plate, according to an embodiment.

FIG. 1 is an exploded perspective view illustrating a portable electronic device 1, according to an embodiment. FIG. 2 is a perspective view illustrating a first camera 10, a second camera 20, a third camera 30, and a fourth camera 40. FIG. 3 is a bottom perspective view illustrating the first camera 10, the second camera 20, the third camera 30, and the fourth camera 40. FIG. 4 is an exploded perspective view illustrating the first camera 10, the second camera 20, the third camera 30, the fourth camera 40, and a base plate 50.

A portable electronic device 1 in the example embodiment may be implemented by a mobile communications terminal device, a smartphone, a tablet PC, or the like.

Referring to FIGS. 1 to 4, the portable electronic device 1 in may include, for example, a case 200, a cover 300, and a camera module 100.

The case 200 and the cover 300 may form an exterior of the portable electronic device 1, and the camera module 100 may be disposed in an internal space of the portable electronic device 1 formed by the case 200 and the cover 300.

The camera module 100 may include a plurality of cameras. As an example, the camera module 100 may include the first camera 10, the second camera 20, the third camera 30, and the fourth camera 40, which are configured to image an object individually. The plurality of cameras may be configured such that positions of one or more cameras among the plurality of cameras may be changed. As an example, positions of the first camera 10 and the second camera 20 may be fixed, and positions of the third camera 30 and the fourth camera 40 may be movable.

In the example embodiment, the camera module 100 may include four cameras, but the disclosure is not limited to this embodiment. The camera module 100 may include at least one fixed camera and at least two movable cameras, for example.

The camera module 100 may further include the base plate 50 and a driver 55.

The first camera 10, the second camera 20, the third camera 30, and the fourth camera 40 may be mounted on a first surface of the base plate 50. The first camera 10 and the second camera 20 may be spaced apart from each other by a predetermined gap, the third camera 30 may be spaced apart from the first camera 10 by a predetermined gap, and the fourth camera 40 may be spaced apart from the second camera 20 by a predetermined gap. As an example, the first to fourth cameras 10 to 40 may be spaced apart from one another such that centers of the first to fourth cameras 10 to 40 may be linearly aligned.

The first camera 10 and the second camera 20 may be configured to be fixed with respect to the base plate 50, and the third camera 30 and the fourth camera 40 may be configured to be movable with respect to the base plate 50. As an example, the third camera 30 may be configured to be rotatable with reference to the first camera 10, and the fourth camera 40 may be configured to be rotatable with respect to the second camera 20. In other words, the third camera 30 may be configured to rotate around the first camera 10, or move in an arcuate path around the first camera 10, and the fourth camera 30 may be configured to rotate around the second camera 20, or move in an arcuate path around the second camera 20.

A rotation direction of the third camera 30 may be opposite to a rotation direction of the fourth camera 40. As an example, the third camera 30 may rotate in a counter-clockwise direction, and the fourth camera 40 may rotate in a clockwise direction. Accordingly, the third camera 30 and the fourth camera 40 may move to be adjacent to each other or to be spaced apart from each other.

After the third camera 30 and the fourth camera 40 are moved, the first to fourth cameras 10, 20, 30, and 40 may be disposed in a quadrangular overall form. As an example, in a state in which movement of the third camera 30 and the fourth camera 40 from respective first positions, in which the third and fourth cameras 30 and 40 are spaced part, to respective second positions, in which the third and fourth cameras 30 and 40 are adjacent to each other, is completed, a path connecting centers of adjacent cameras among the first to fourth cameras 10, 20, 30, and 40 to one another may form a quadrangular shape.

The base plate 50 may include a plurality of holes penetrating the base plate 50 (see FIG. 4). As an example, plurality of holes in the base plate 50 may include a first insertion hole 51a, a second insertion hole 52a, a first guide hole 53a, and a second guide hole 54a.

Each of the first to fourth cameras 10, 20, 40, and 40 may include a protrusion (see FIG. 3). As an example, the first camera 10 may include a first protrusion 11 protruding from a bottom surface of the first camera 10, the second camera 20 may include a second protrusion 21 protruding from a bottom surface of the second camera 20, the third camera 30 may include a third protrusion 31 protruding from a bottom surface of the third camera 30, and the fourth camera 40 may include a fourth protrusion 41 protruding from a bottom surface of the fourth camera 40.

Each of the first to fourth protrusions 11 to 41 may have a cylindrical shape.

The first protrusion 11 may be disposed in the first insertion hole 51a, the second protrusion 21 may be disposed in the second insertion hole 52a, the third protrusion 31 may be disposed in the first guide hole 53a, and the fourth protrusion 41 may be disposed in the second guide hole 54a.

A length of each of the first to fourth protrusions 11, 21, 31, and 41 may be greater than a thickness of the base plate 50. Accordingly, each of the first to fourth protrusions 11, 21, 31, and 41 may be configured to protrude to an external side of the base plate 50.

Each of the first insertion hole 51a and the second insertion hole 52a may have a circular shape. The first protrusion 11 may be inserted into the first insertion hole 51a, and the second protrusion 21 may be inserted into the second insertion hole 52a.

A plurality of first fastening holes 51b may be disposed around the first insertion hole 51a, and a plurality of second fastening holes 52b may be disposed around the second insertion hole 52a. As an example, the plurality of first fastening holes 51b may be formed in positions corresponding to corner regions of the first camera 10, and the plurality of second fastening holes 52b may be formed in positions corresponding to corner regions of the second camera 20.

The first camera 10 may include a plurality of first fastening projections 13 disposed around the first protrusion 11, and the second camera 20 may include a plurality of second fastening projections 23 disposed around the second protrusion 21.

As an example, the first protrusion 11 may be formed in a center region of the bottom surface of the first camera 10, and the plurality of first fastening projections 13 may be formed in corner regions of the bottom surface of the first camera 10. The second protrusion 21 may be formed in a center region of the bottom surface of the second camera 20, and the plurality of second fastening projections 23 may be formed in corner regions of the bottom surface of the second camera 20.

The plurality of first fastening projections 13 may be inserted to the plurality of first fastening holes 51b, and accordingly, a position of the first camera 10 may be fixed with respect to the base plate 50. Also, the plurality of second fastening projections 23 may be inserted into the plurality of second fastening holes 52b, and accordingly, a position of the second camera 20 may be fixed with respect to the base plate 50.

The first guide hole 53a and the second guide hole 54a may be configured to have lengths according to rotation directions/paths of corresponding cameras, respectively.

The third protrusion 31 may be moveable along the first guide hole 53a. The fourth protrusion 41 may be moveable along the second guide hole 54a.

To allow the third camera 30 and the fourth camera 40 to rotate and move, each of the first guide hole 53a and the second guide hole 54a may have an arc shape.

As an example, each of the first guide hole 53a and the second guide hole 54a may be configured to have a rounded shape.

The base plate 50 may further include a plurality of guide rails (see FIG. 4). As an example, the base plate 50 may include a first guide rail 53b and a second guide rail 54b.

The first guide rail 53b may be disposed adjacent to the first guide hole 53a, and the second guide rail 54b may be disposed adjacent to the second guide hole 54a. The first guide rail 53b may be configured to have a length in a rotation direction of the third camera 30, and the second guide rail 54b may be configured to have a length in a rotation direction of the fourth camera 40.

Each of the first guide rail 53b and the second guide rail 54b may have an arc shape. As an example, each of the first guide rail 53b and the second guide rail 54b may have a rounded shape.

The first guide rail 53b may include two first guide rail members, and the two first guide members may be spaced apart from each other by a predetermined gap. The second guide rail 54b may include two second guide members, and the two second guide rail members may be spaced apart from each other by a predetermined gap.

Each of the third camera 30 and the fourth camera 40 may include a guide projection (see FIG. 3). For example, the third camera 30 may include a first guide projection 33 disposed outward from the third protrusion 31, and the fourth camera 40 may include a second guide projection 43 disposed outward from the fourth protrusion 41.

As an example, the third protrusion 31 may be formed in a center region of the bottom surface of the third camera 30, and the first guide projection 33 may be formed in a position spaced apart from the third protrusion 31 in a diagonal direction. For example, the first guide projection 33 may be disposed may be disposed near a corner region of the bottom surface of the third camera 30. The fourth protrusion 41 may be formed in a center region of the bottom surface of the fourth camera 40, and the second guide projection 43 may be disposed in a position spaced apart from the fourth protrusion 41 in a diagonal direction. For example, the second guide projection 43 may be disposed may be disposed near a corner region of the bottom surface of the fourth camera 40.

The first guide projection 33 may include two first guide projections, and the two first guide projections may be spaced part from each other by a predetermined gap. The second guide projection 43 may include two second guide projections, and the two second guide projections may be spaced part from each other by a predetermined gap.

The first guide projection 33 may be inserted into and disposed in the first guide rail 53b, and the second guide projection 43 may be inserted into and disposed in the second guide rail 54b. The first guide projection 33 may be movable along the first guide rail 53b, and the second guide projection 43 may be movable along the second guide rail 54b.

Figure 6A:
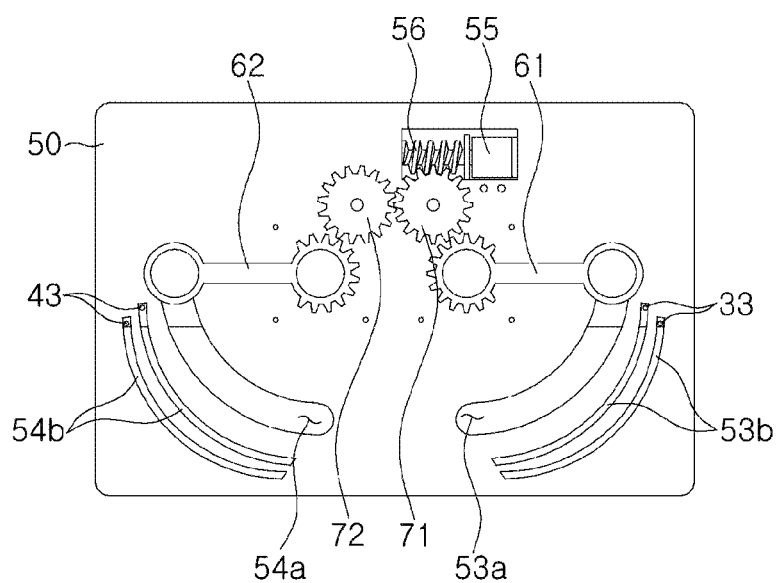
FIG. 6A is a bottom view illustrating a state in which the first to fourth cameras are disposed in a camera module in a first configuration in which the third and fourth cameras are disposed in respective first positions, according to an embodiment.
Figure 6B:
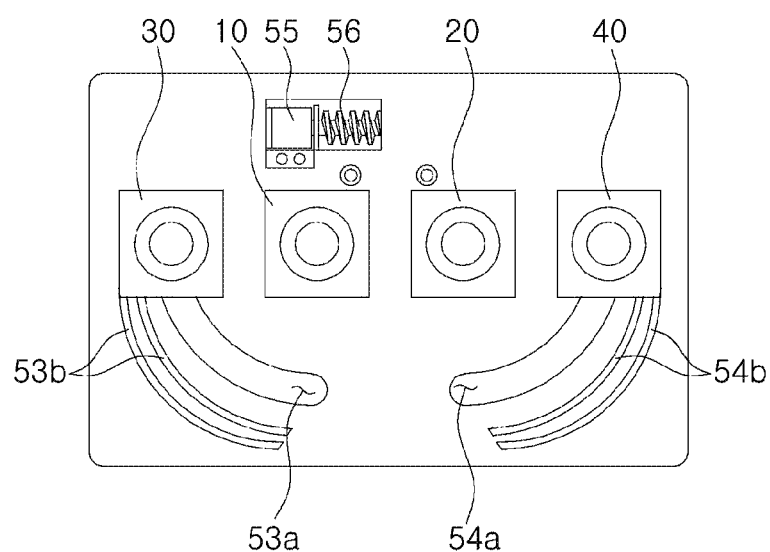
FIG. 6B is a plan view illustrating the state in which the first to fourth cameras are disposed in the camera module in the first configuration, according to an embodiment.
Figure 7A:
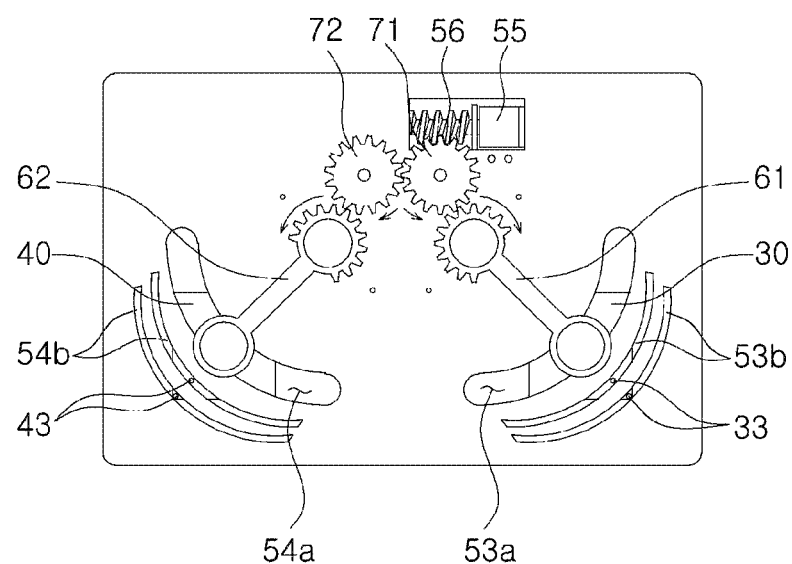
FIG. 7A is a bottom view illustrating a state in which the third camera and the fourth camera rotate from the respective first positions to respective second positions in the camera module, according to an embodiment.
Figure 7B:
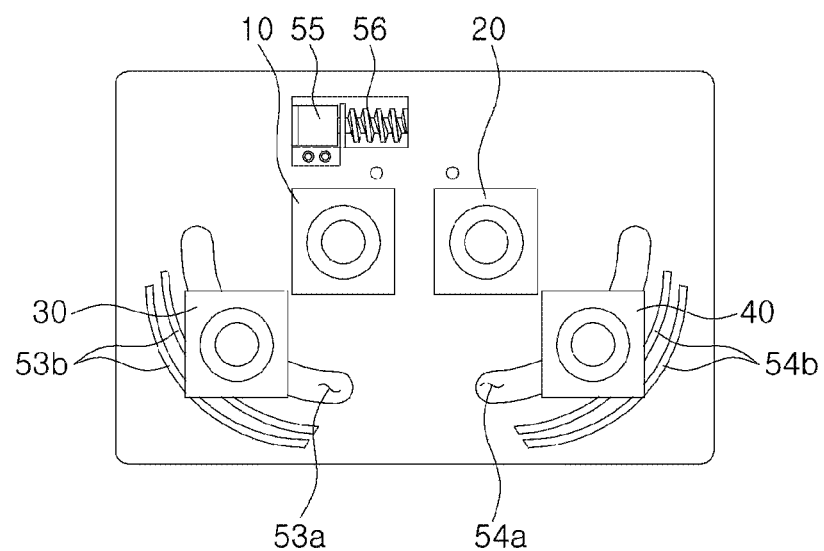
FIG. 7B is a plan view illustrating the state in which the third camera and the fourth camera rotate from the respective first positions to the respective second positions in the camera module, according to an embodiment.
Figure 8A:
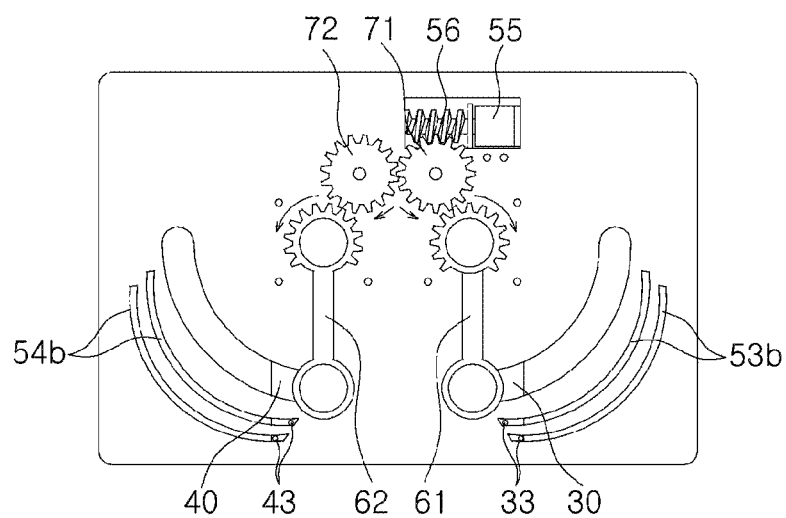
FIG. 8A is a bottom view illustrating a state in which the first to fourth cameras are disposed in the camera module in a second configuration in which the third camera and the fourth camera are disposed in the respective second positions, according to an embodiment.
Figure 8B:
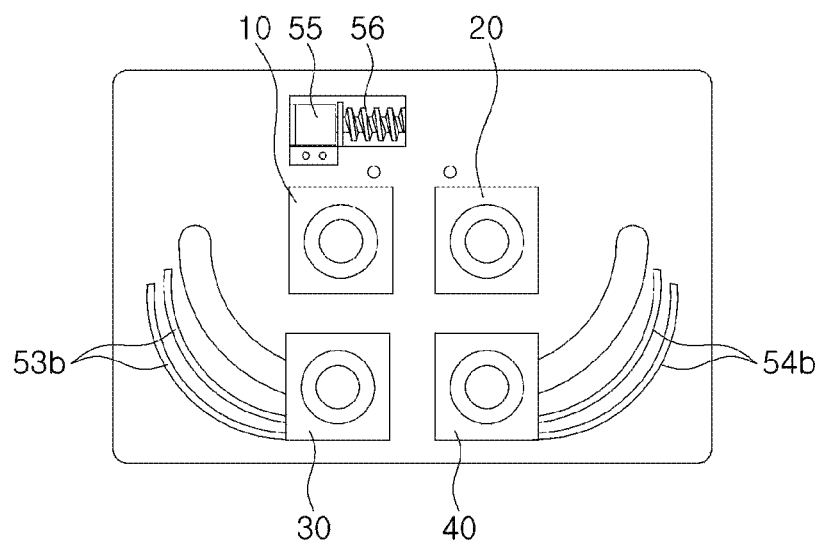
FIG. 8B is a plan view illustrating the state in which the first to fourth cameras are disposed in the camera module in the second configuration, according to an embodiment.
Figure 9A:
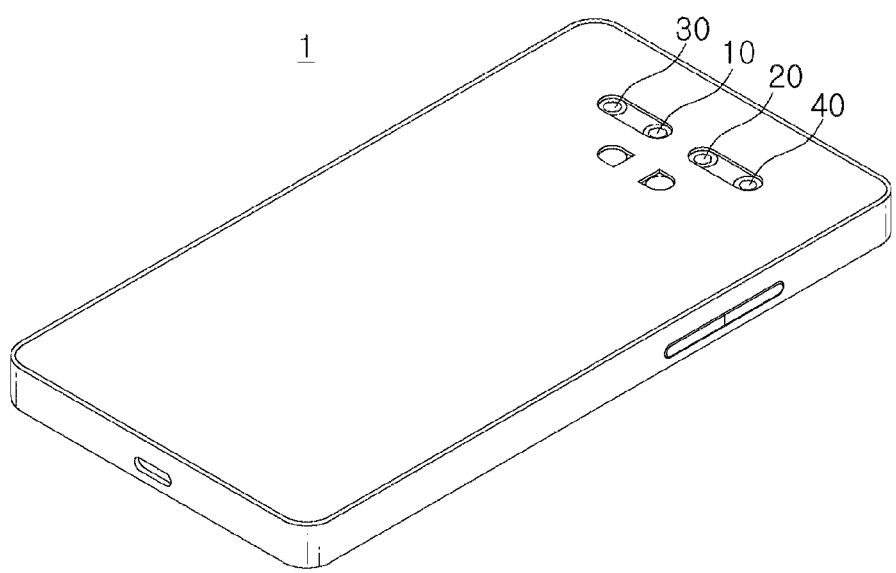
FIG. 9A is a perspective view illustrating a portable electronic device in a state in which first to fourth cameras are disposed in a first configuration in which the third camera and the fourth camera are disposed in respective first positions, according to an embodiment.
Figure 9B:
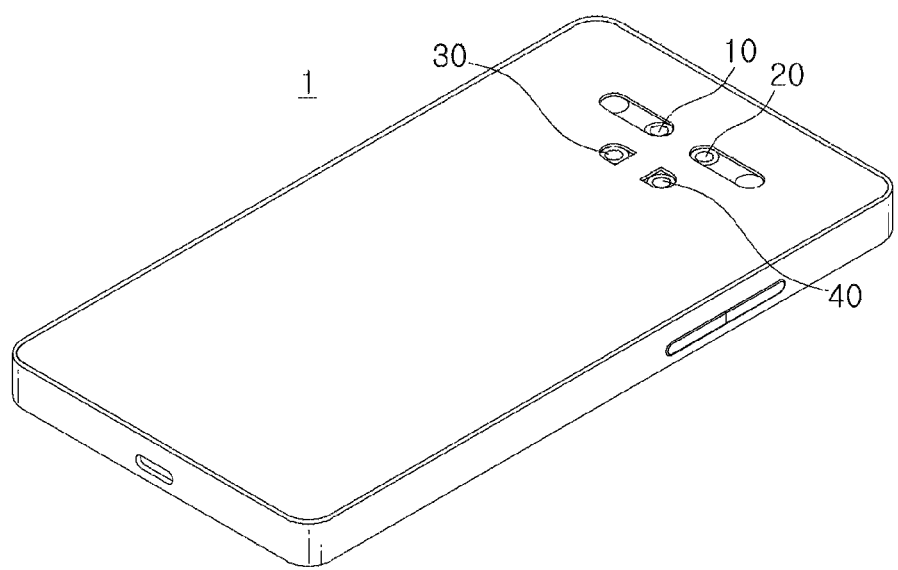
FIG. 9B is a perspective view illustrating the portable electronic device in a state in which the first to fourth cameras are disposed in a second configuration in which the third camera and the fourth camera are disposed in respective second positions, according to an embodiment.

The third camera 30 may rotate in a counterclockwise direction with reference to (e.g., around) the first camera 10 along the first guide hole 53a and the first guide rail 53b (see FIGS. 6B, 7B, and 8B). The fourth camera 40 may rotate in a counterclockwise direction with reference to (e.g., around) the second camera 20 along the second guide hole 54a and the second guide rail 54b (see FIGS. 6B, 7B, and 8B).

Referring to FIG. 1, an opening 310 may be provided on the cover 300 of the portable electronic device 1 such that light may be incident to a lens of each camera. A cover glass 90 may be disposed in the opening 310. The cover glass 90 may seal the opening 310. Accordingly, external foreign objects may be prevented from entering the internal space of the portable electronic device 1.

FIGS. 5A to 5E are bottom views illustrating a process in which first to fourth cameras 10, 20, 30, and 40 are coupled to a base plate.

Referring to FIGS. 5A to 5E, a portion of a plurality of cameras included in the camera module 100 may be connected to each other by a link member 60. For example, the first to fourth cameras 10, 20, 30, and 40 may be mounted on the first surface of a base plate 50, and the link member 60 may be mounted on a second surface of the base plate 50 opposite the first surface of the base plate 50. The link member 60 may include a first link member 61 and a second link member 62. As an example, the first camera 10 and the third camera 30 may be connected to each other by the first link member 61, and the second camera 20 and the fourth camera 40 may be connected to each other by the second link member 62.

Figure 5A:
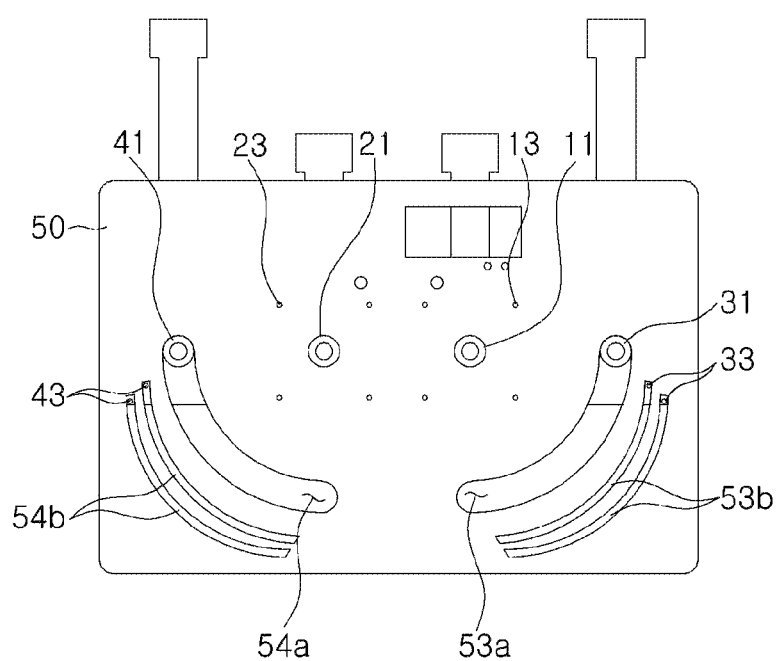
FIGS. 5A to 5E are bottom views illustrating a process in which first to fourth cameras are coupled to the base plate, according to an embodiment.

Referring to FIG. 5A, the first to fourth cameras 10 to 40 may be coupled to the base plate 50. For example, each of the protrusions 11, 21, 31, and 41 of the cameras may be disposed to protrude externally from the second surface of the base plate 50. The first camera 10 and the second camera 20 may be fixed to and disposed in the base plate 50 by the fastening projections 13 and 23, respectively, being coupled to a fastening hole.

Figure 5B:
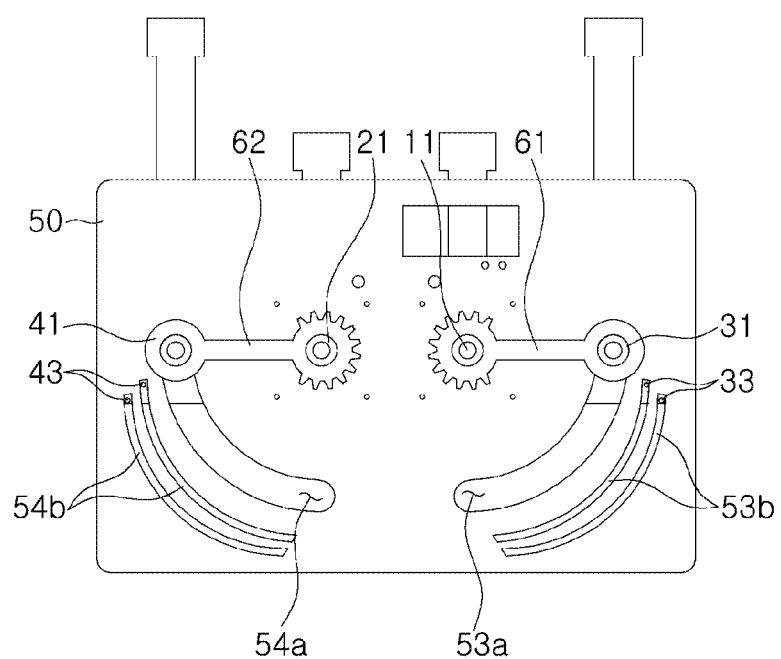

Referring to FIG. 5B, insertion holes may be respectively provided on both ends of the first link member 61. The insertion holes may be respectively coupled to the first protrusion 11 of the first camera 10 and the third protrusion 31 of the third camera 30. Accordingly, a first end of the first link member 61 may be coupled to the first protrusion 11, and a second end (opposite the first end) of the first link member 61 may be coupled to the third protrusion 31.

Each of the first protrusion 11 of the first camera 10, the third protrusion 31 of the third camera 30, and the insertion holes of the first link member 61 may have a circular shape. Accordingly, the first end of the first link member 61 may be rotatable with respect to the first camera 10, and the second end of the first link member 61 may be rotatable with respect to the third camera 30.

An external side surface of the first end of the first link member 61 may have a serrated shape.

Insertion holes may be provided on each of both ends of the second link member 62. The insertion holes may be respectively coupled to the second protrusion 21 of the second camera 20 and the fourth protrusion 41 of the fourth camera 40. Accordingly, a first end of the second link member 62 may be coupled to the second protrusion 21, and a second end (opposite the first end) of the second link member 62 may be coupled to the fourth protrusion 41.

Each of the second protrusion 21 of the second camera 20, the fourth protrusion 41 of the fourth camera 40, and the insertion holes of the second link member 62 may have a circular shape. Accordingly, the first end of the second link member 62 may rotate with respect to the second camera 20, and the second end of the second link member 62 may rotate with respect to the fourth camera 40.

An external side surface of the first end of the second link member 62 may have a serrated shape.

Figure 5C:
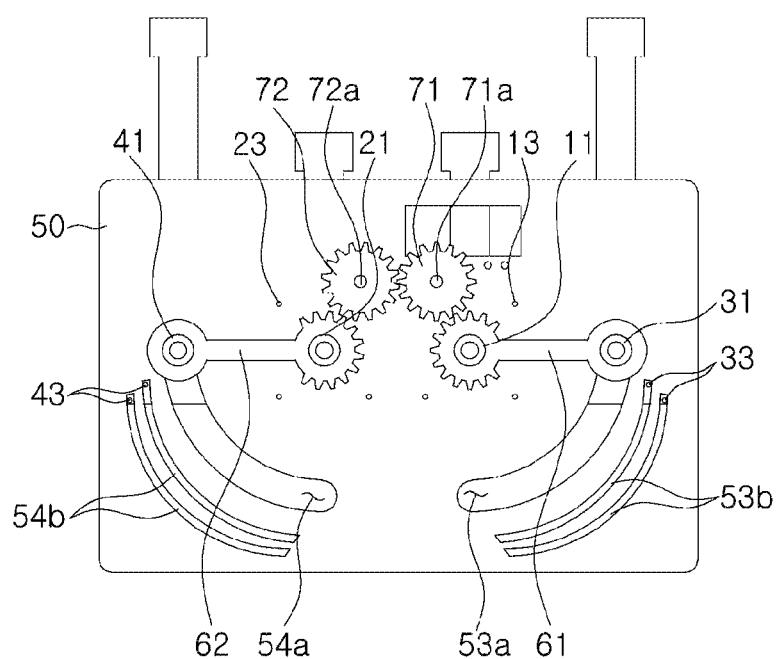

Referring to FIG. 5C, a first gear 71 and a second gear 72 may be rotatably coupled to the second surface of the base plate 50 through shafts 71a and 72a, respectively. The first gear 71 may be disposed to be engaged with the first end of the first link member 61, and the second gear 72 may be disposed to be engaged with the first end of the second link member 62. Also, the first gear 71 and the second gear 72 may be disposed to be engaged with each other.

Figure 5D:
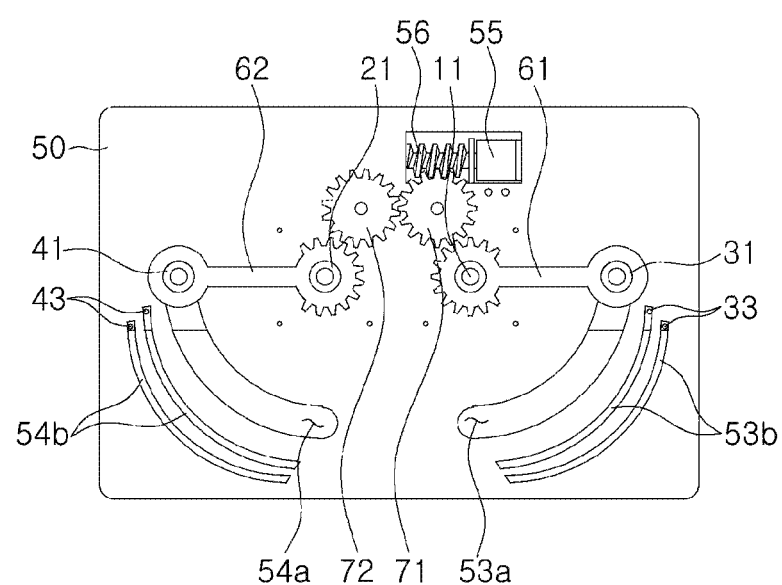

Referring to FIG. 5D, the driver 55 may be disposed on the base plate 50. The driver 55 may be a motor having a rotating shaft 56, and the rotating shaft 56 of the driver 55 may be disposed to be engaged with either one of the first gear 71 and the second gear 72.

Figure 5E:
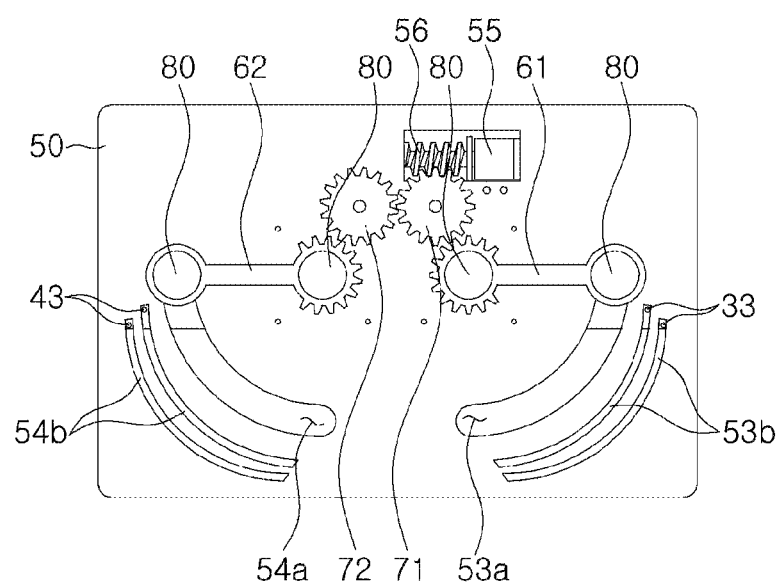

Referring to FIG. 5E, a cap 80 may be coupled to an end of each of the protrusions 11, 21, 31, and 41 to prevent the first link member 61 and the second link member 62 from being detached.

One of the first gear 71 and the second gear 72 may be disposed to be engaged with the rotating shaft 56 of the driver 55. The first gear 71 and the second gear 72 may be disposed to be engaged with each other. Additionally, the first gear 71 may be disposed to be engaged with the first end of the first link member 61, and the second gear 72 may be disposed to be engaged with the first end of the second link member 62. The first gear 71 and the second gear 72 may rotate by driving force of the driver 55, and accordingly, the first link member 61 and the second link member 62 may rotate.

The first link member 61 may rotate with reference to (e.g., around) the first protrusion 11 of the first camera 10. Accordingly, the third camera 30, which is coupled to the second end of the first link member 61, may rotate while being interlocked with the first link member 61.

The second link member 62 may rotate with reference to (e.g., around) the second protrusion 21 of the second camera 20. Accordingly, the fourth camera 40, which is coupled to the second end of the second link member 62, may rotate while being interlocked with the second link member 62.

Accordingly, as driving force of the driver 55 is transferred to the first link member 61 and the second link member 62 through the first gear 71 and the second gear 72, the third camera 30 and the fourth camera 40 may rotate and move to be adjacent to each other or to be spaced apart from each other.

As the third camera 30 and the fourth camera 40 may rotate simultaneously, a dispositional form of the first to fourth cameras 10, 20, 30, and 40 may be converted from a linear form to a quadrangular form.

FIG. 6A is a bottom view illustrating a state in which the first to fourth cameras 10, 20, 30, and 40 are disposed in a camera module in a first configuration in which the third and fourth cameras 30 and 40 are disposed in respective first positions, according to an embodiment. FIG. 6B is a plan view illustrating the state in which first to fourth cameras 10, 20, 30, and 40 are disposed in the camera module in the first configuration, according to an embodiment.

FIG. 7A is a bottom view illustrating a state in which the third camera 30 and the fourth camera 40 rotate from the respective first positions to respective second positions in the camera module according to an embodiment. FIG. 7B is a plan view illustrating the state in which a third camera 30 and the fourth camera 40 rotate from the respective first positions to the respective second positions in the camera module, according to an embodiment.

FIG. 8A is a bottom view illustrating a state in which the first to fourth cameras 10, 20, 30, and 40 are disposed in the camera module in a second configuration in which the third camera 30 and the fourth camera 40 are disposed in the respective second positions, according to an embodiment. FIG. 8B is a plan view illustrating the state in which the first to fourth cameras 10, 20, 30, and 40 are disposed in the camera module in the second configuration, according to an embodiment.

As described above, FIGS. 6A and 6B illustrate an example in which the first to fourth cameras 10, 20, 30, and 40 are disposed in the first configuration. The first configuration is, for example, a configuration in which centers of the first to fourth cameras 10, 20, 30, and 40 are aligned linearly.

As described above, FIGS. 8A and 8B illustrate an example in which the first to fourth cameras 10, 20, 30, and 40 are disposed in the second configuration. The second configuration is, for example, a configuration in which the first to fourth cameras 10, 20, 30, and 40 are disposed in a quadrangular overall form. For example, in the second configuration, a path connecting centers of adjacent cameras among the first to fourth cameras 10, 20, 30, and 40 may have a quadrangular shape.

FIGS. 7A and 7B illustrate an example in which the third camera 30 and the fourth camera 40 are disposed in respective intermediate positions between the respective first positions (corresponding to the first configuration) and second positions (corresponding to the second configuration).

As illustrated in FIGS. 6A to 8B, the third camera 30 and the fourth camera 40 may rotate and move between the respective first positions and the respective second positions.

Referring to FIGS. 6A to 8B, a curvature of a first guide hole 53a may be different from a curvature of a first guide rail 53b. A length of the first guide hole 53a may be different from a length of the first guide rail 53b. As an example, a length of the first guide hole 53a may be shorter than a length of the first guide rail 53b. The third protrusion 31 of the third camera 30 may move along the first guide hole 53a. The first guide projection 33 of the third camera 30 may move along the first guide rail 53b.

Since a curvature of the first guide hole 53a is different from a curvature of the first guide rail 53b, the third camera 30 may rotate with reference to (e.g., around) the first camera 10, and may not rotate with reference to a center of the third camera 30. In other words, the third camera 30 may revolve around the first camera 10 and may not rotate around its own center.

A curvature of a second guide hole 54a may be different from a curvature of a second guide rail 54b. A length of the second guide hole 54a may be different from a length of the second guide rail 54b. As an example, a length of the second guide hole 54a may be shorter than a length of the second guide rail 54b. The fourth protrusion 41 of the fourth camera 40 may move along the second guide hole 54a. The second guide projection 43 of the fourth camera 40 may move along the second guide rail 54b.

Since a curvature of the second guide hole 54a is different from a curvature of the second guide rail 54b, the fourth camera 40 may rotate with reference to (e.g., around) the second camera 20, and may not rotate with reference to a center of the fourth camera 40. In other words, the fourth camera 40 may revolve around the second camera 20, and may not rotate around its own center.

Each of the first to fourth cameras 10, 20, 30, and 40 may include an image sensor, and each image sensor may have a rectangular shape. Accordingly, each image sensor may have a long side and a short side.

When the third camera 30 and the fourth camera 40 rotate and move, since the third camera 30 and the fourth camera 40 do not rotate, a dispositional form or orientation of the image sensor of the third camera 30 and a dispositional form or orientation of the image sensor of the fourth camera 40 in the first positions (corresponding to the first configuration) of the third and fourth cameras 30 and 40 may be the same as the dispositional forms of the image sensor of the third camera 30 and the image sensor of the fourth camera 40 in the second positions (corresponding to the second configuration) of the third and fourth cameras 30 and 40.

As an example, a long side of the image sensor of the third camera 30 in the first position of the third camera 30 may be parallel to a long side of the image sensor of the third camera 30 in the second position of the third camera 30. Also, a long side of the image sensor of the fourth camera 40 in the first position of the fourth camera 40 may be parallel to a long side of the image sensor of the fourth camera 40 in the second position of the fourth camera 40.

Figure 10A:
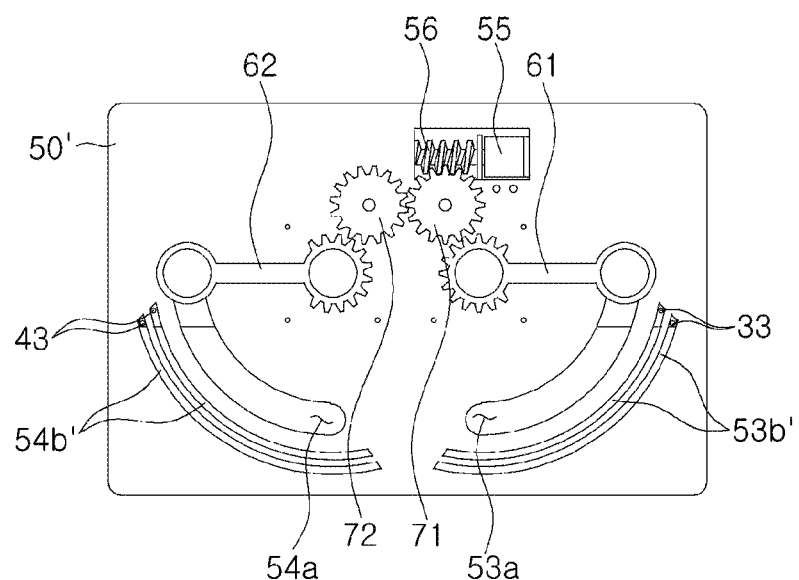
FIG. 10A is a bottom view illustrating a state in which first to fourth cameras are disposed in a camera module in a first configuration in which the third camera and the fourth camera are disposed in respective first positions, according to an embodiment.
Figure 10B:
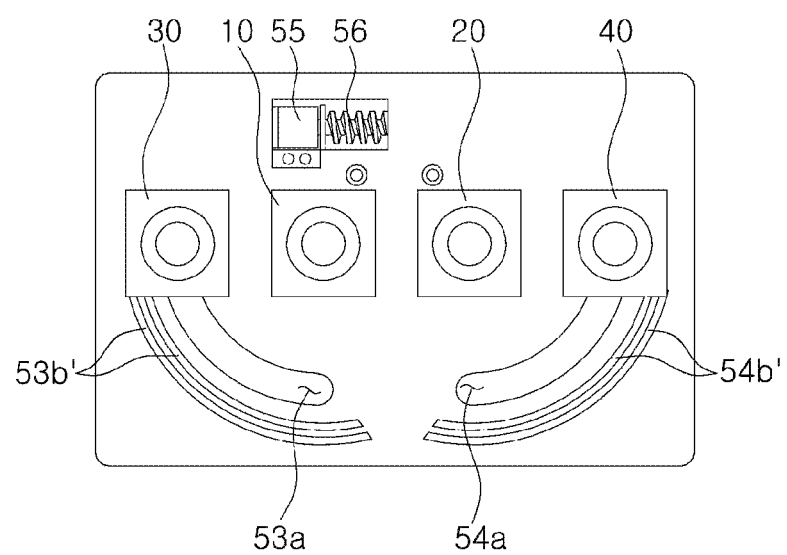
FIG. 10B is a plan view illustrating the state in which the first to fourth cameras are disposed in the camera module of FIG. 10A in the first configuration, according to an embodiment.

FIG. 10A is a bottom view illustrating a state in which the first to fourth cameras 10, 20, 30, and 40 are disposed in a camera module in a first configuration in which the third and fourth cameras 30 and 40 are disposed in respective first positions, according to an embodiment. FIG. 10B is a plan view illustrating the state in which the first to fourth cameras 10, 20, 30, and 40 are disposed in the camera module of FIG. 10A in the first configuration, according to an embodiment.

Figure 11A:
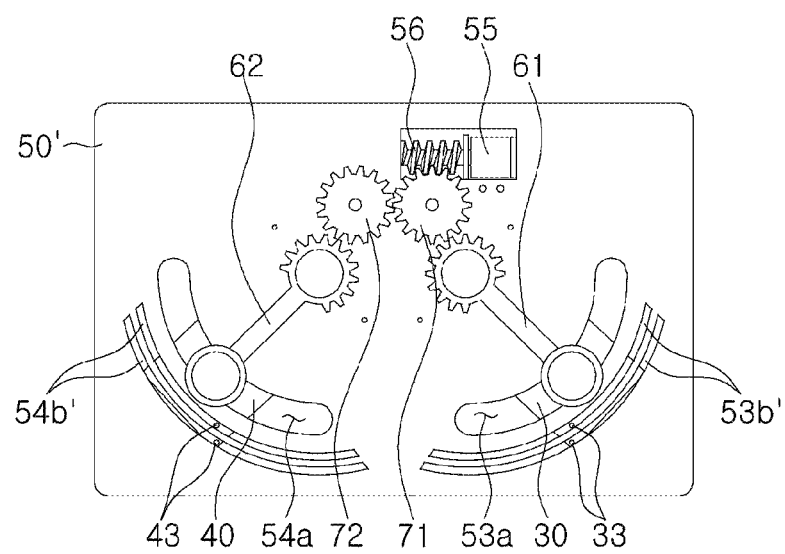
FIG. 11A is a bottom view illustrating a state in which the third camera and the fourth camera of rotate from the respective first positions to respective second positions in the camera module of FIG. 10A, according to an embodiment.
Figure 11B:
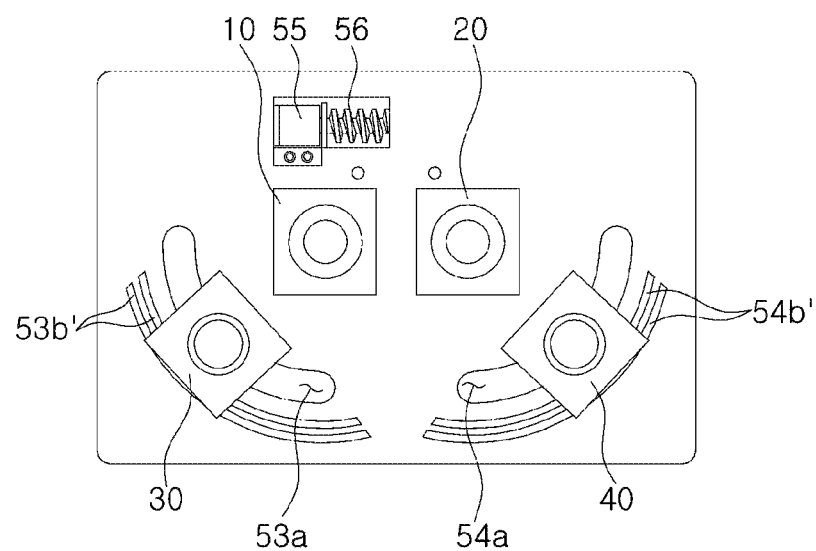
FIG. 11B is a plan view illustrating the state in which the third camera and the fourth camera rotate from the respective first positions to the respective second positions in the camera module of FIG. 10A, according to an embodiment.

FIG. 11A is a bottom view illustrating a state in which the third camera 30 and the fourth camera 40 rotate from the respective first positions to respective second positions in the camera module of FIG. 10A, according to an embodiment. FIG. 11B is a plan view illustrating the state in which a third camera 30 and the fourth camera 40 rotate from the respective first positions to the respective second positions in the camera module of FIG. 10A, according to an embodiment.

Figure 12A:
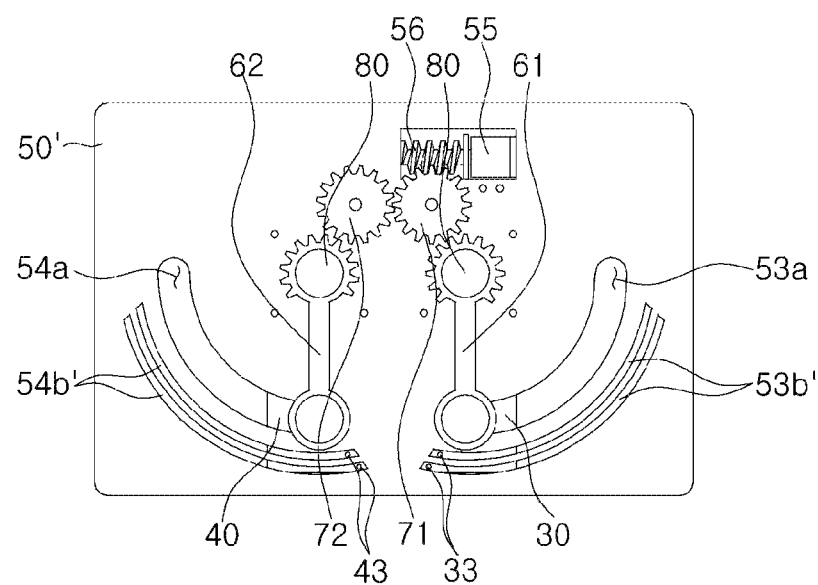
FIG. 12A is a bottom view illustrating a state in which the first to fourth cameras are disposed in the camera module of FIG. 10A in a second configuration in which the third camera and the fourth camera are disposed in the respective second positions, according to an embodiment.
Figure 12B:
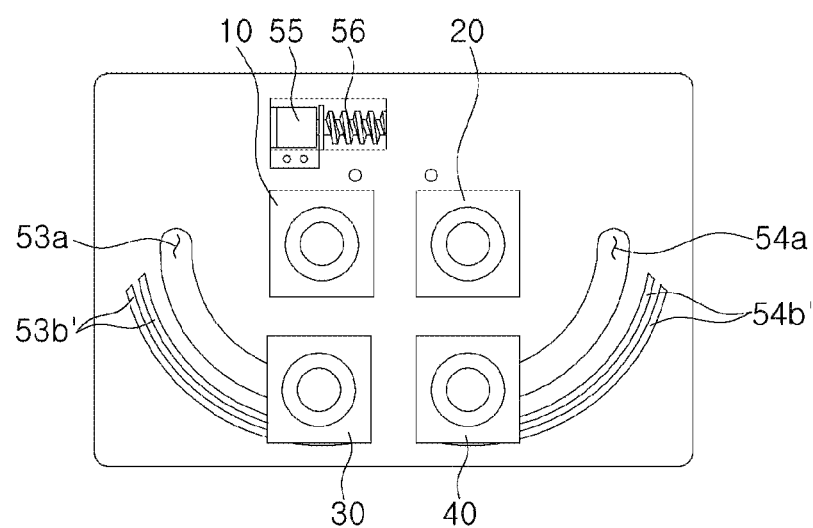
FIG. 12B is a plan view illustrating the state in which the first to fourth cameras are disposed in the camera module of FIG. 10A in the second configuration, according to an embodiment.

FIG. 12A is a bottom view illustrating a state in which the first to fourth cameras 10, 20, 30, and 40 are disposed in the camera module of FIG. 10A in a second configuration in which the third camera 30 and the fourth camera 40 are disposed in the respective second positions, according to an embodiment. FIG. 12B is a plan view illustrating a state in which the first to fourth cameras 10, 20, 30, and 40 are disposed in the camera module of FIG. 10A in the second configuration, according to an embodiment.

As for the embodiments illustrated in FIGS. 10A to 12B, shapes of a first guide rail 53b' and a second guide rail 54b' of a base plate 50' may be different from shapes of the first guide rail 53b and the second guide rail 54 in the embodiments illustrated in FIGS. 6A to 8B.

Referring to FIGS. 10A to 12B, a curvature of the first guide hole 53a may be the same as a curvature of the first guide rail 53b'. The third protrusion 31 of the third camera 30 may move along the first guide hole 53a, and the first guide projection 33 of the third camera 30 may move along the first guide rail 53b'.

Since the curvature of the first guide hole 53a is the same as the curvature of the first guide rail 53b', the third camera 30 may rotate with reference to the first camera 10 and may rotate with reference to (e.g., around) the center of the third camera 30 at the same time. In other words, the third camera 30 may revolve around the first camera 10 and may rotate around its own center.

A curvature of the second guide hole 54a may be the same as a curvature of the second guide rail 54b'. The fourth protrusion 41 of a fourth camera 40 may move along the second guide hole 54a, and the second guide projection 43 of the fourth camera 40 may move along the second guide rail 54b'.

Since a curvature of the second guide hole 54a is the same as a curvature of the second guide rail 54b', the fourth camera 40 may rotate with reference to the second camera 20 and may rotate with reference to (e.g., around) the center of the fourth camera 40 at the same time. In other words, the fourth camera 40 may revolve around the second camera 20 and may rotate around its own center.

Each of the first to fourth cameras 10 to 40 may include an image sensor, and each image sensor may have a rectangular shape. Accordingly, the image sensor may have a long side and a short side.

When the third camera 30 and the fourth camera 40 rotate and move, the third camera 30 and the fourth camera 40 may rotate around their centers. Accordingly, a dispositional form or orientation of the image sensor of the third camera 30 and a dispositional form or orientation of the image sensor of the fourth camera 40 in the first positions (corresponding to the first configuration) of the third and fourth cameras 30 and 40 may be different from the dispositional forms of the image sensor of the third camera 30 and the image sensor of the fourth camera 40 in the second positions (corresponding to the second configuration) of the third and fourth cameras 30 and 40.

As an example, a long side of the image sensor of the third camera 30 in the first position of the third camera 30 may be perpendicular to a long side of the image sensor of the third camera 30 in the second position of the third camera 30. Also, a long side of the image sensor of the fourth camera 40 in the first position of the fourth camera 40 may be perpendicular to a long side of the image sensor of the fourth camera 40 in the second position of the fourth camera 40.

Accordingly, in the embodiments of FIGS. 10A to 12B, even when the portable electronic device 1 is disposed in a vertical direction while imaging an object, the portable electronic device 1 may obtain a horizontal image. Also, even when the electronic device 1 is disposed in a horizontal direction while imaging an object, the portable electronic device 1 may obtain a vertical image.

Figure 13A:
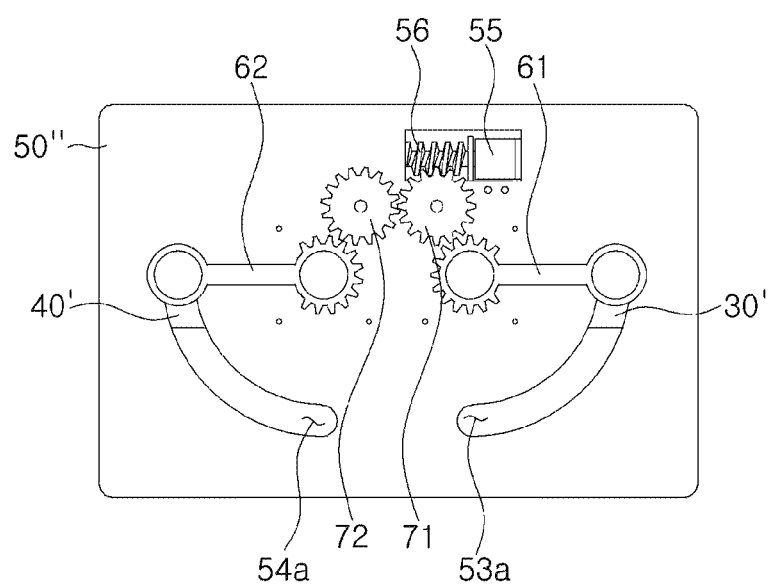
FIG. 13A is a bottom view illustrating a state in which first to fourth cameras are disposed in a camera module in a first configuration in which the third camera and the fourth camera are disposed in respective first positions, according to an embodiment.
Figure 13B:
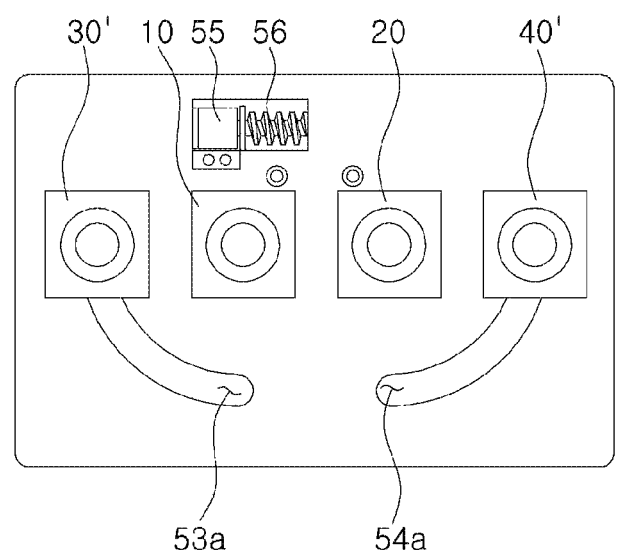
FIG. 13B is a plan view illustrating the state in which the first to fourth cameras are disposed in the camera module of FIG. 13A in the first configuration, according to an embodiment.

FIG. 13A is a bottom view illustrating a state in which first to fourth cameras 10, 20, 30', and 40' are disposed in a camera module in a first configuration in which the first camera 30' and the second camera 40' are disposed in respective first positions, according to an embodiment. FIG. 13B is a plan view illustrating the state in which the first to fourth cameras 10, 20, 30', and 40' are disposed in the camera module of FIG. 13A in the first configuration, according to an embodiment.

Figure 14A:
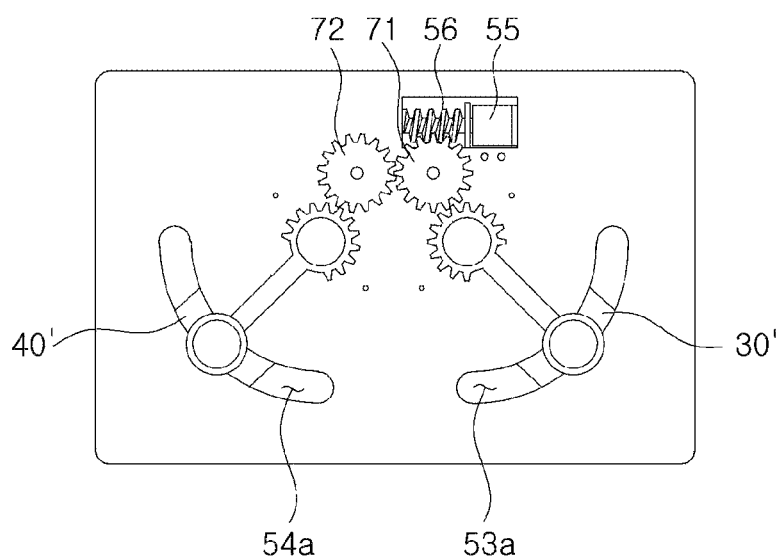
FIG. 14A is a bottom view illustrating a state in which the third camera and the fourth camera rotate from the respective first positions to respective second positions in the camera module of FIG. 13A, according to an embodiment.
Figure 14B:
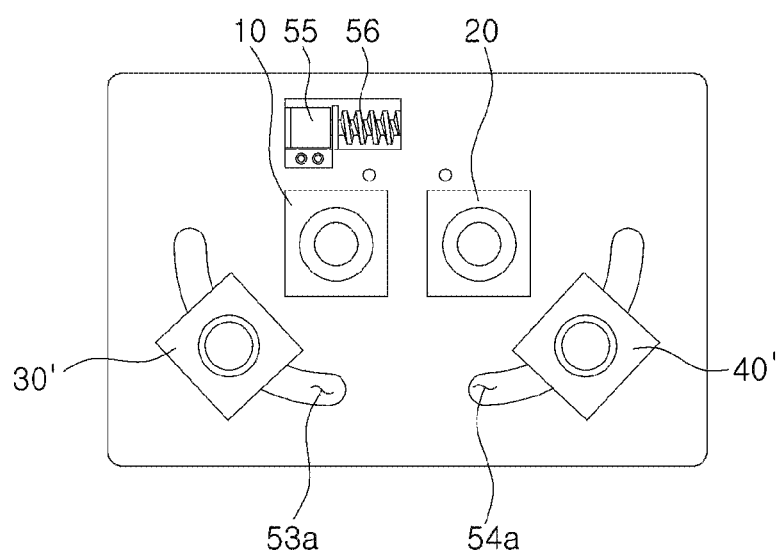
FIG. 14B is a plan view illustrating the state in which the third camera and the fourth camera rotate from the respective first positions to the respective second positions in the camera module of FIG. 13A, according to an embodiment.

FIG. 14A is a bottom view illustrating a state in which the third camera 30' and the fourth camera 40' rotate from the respective first positions to respective second positions in the camera module of FIG. 13A, according to an embodiment. FIG. 14B is a plan view illustrating the state in which the third camera 30' and the fourth camera 40' rotate from the respective first positions to the respective second positions in the camera module of FIG. 13A, according to an embodiment.

Figure 15A:
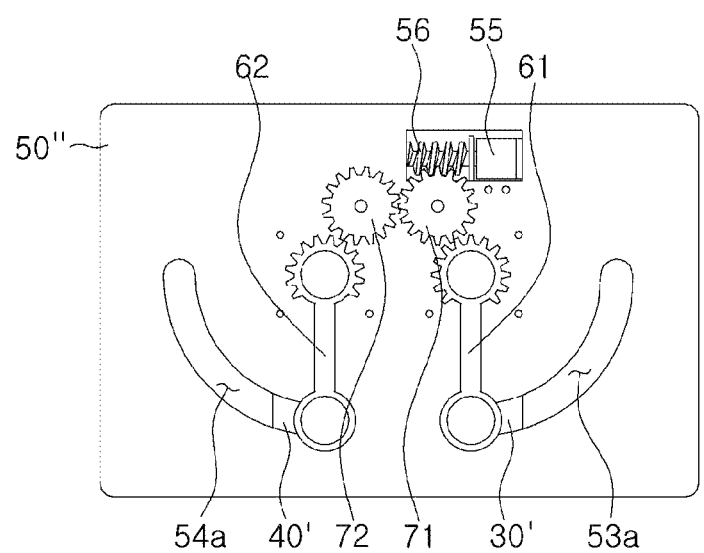
FIG. 15A is a bottom view illustrating a state in which the first to fourth cameras are disposed in the camera module of FIG. 13A in a second configuration in which the third camera and the fourth camera are disposed in the respective second positions, according to an embodiment.
Figure 15B:
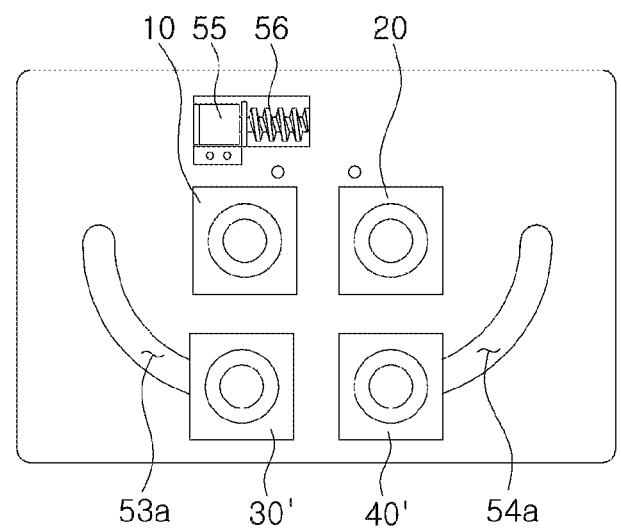
FIG. 15B is a plan view illustrating the state in which the first to fourth cameras are disposed in camera module of FIG. 13A in the second configuration, according to an embodiment.

FIG. 15A is a bottom view illustrating a state in which the first to fourth cameras 10, 20, 30', and 40' are disposed in the camera module of FIG. 13A in a second configuration in which the third camera 30' and the fourth camera 40' are disposed in the respective second positions, according to an embodiment. FIG. 15B is a plan view illustrating a state in which the first to fourth cameras 10, 20, 30', and 40' are disposed in the camera module of FIG. 13A in the second configuration, according to an embodiment.

The embodiments illustrated in FIGS. 13A to 15B may be different from the embodiments illustrated in FIGS. 10A to 12B in that the first guide rail 53b', the first guide projection 33, the second guide rail 54b', and the second guide projection 43 are not included in the embodiments illustrated in FIGS. 13A to 15B. For example, a base plate 50" may include the first guide hole 53a and the second guide hole 54a, a third camera 30' may include a third protrusion 31 disposed in the first guide hole 53a, and the fourth camera 40' may include a fourth protrusion 41 disposed in the second guide hole 54a.

The third camera 30' may rotate and move along the first guide hole 53a, and the fourth camera 40' may rotate and move along the second guide hole 54a. The third camera 30' may rotate with reference to the first camera 10 and may rotate with reference to (e.g., around) a center of the third camera 30' at the same time. In other words, the third camera 30' may revolve around the first camera 10 and may rotate around its own center.

The fourth camera 40' may rotate with reference to the second camera 20 and may rotate with reference to (e.g., around) a center of the fourth camera 40' at the same time. In other words, the fourth camera 40' may revolve around the second camera 20 and may rotate around its own center.

When the third camera 30' and the fourth camera 40' rotate and move, as the third camera 30' and the fourth camera 40' may rotate around their centers, a dispositional form or orientation of the image sensor of the third camera 30' and a dispositional form or orientation of the image sensor of the fourth camera 40' in the first positions (corresponding to the first configuration) of the third and fourth cameras 30' and 40' may be different from the dispositional forms or orientations of the image sensor of the third camera 30' and the image sensor of the fourth camera 40' in the second positions (corresponding to the second configuration) of the third camera 30' and the image sensor of the fourth camera 40'.

As an example, a long side of the image sensor of the third camera 30' in the first position of the third camera 30' may be perpendicular to a long side of the image sensor of the third camera 30' in the second position of the third camera 30'. Also, a long side of the image sensor of the fourth camera 40' in the first position of the fourth camera 40' may be perpendicular to a long side of the image sensor of the fourth camera 40' in the second position of the fourth camera 40'.

Figure 16:
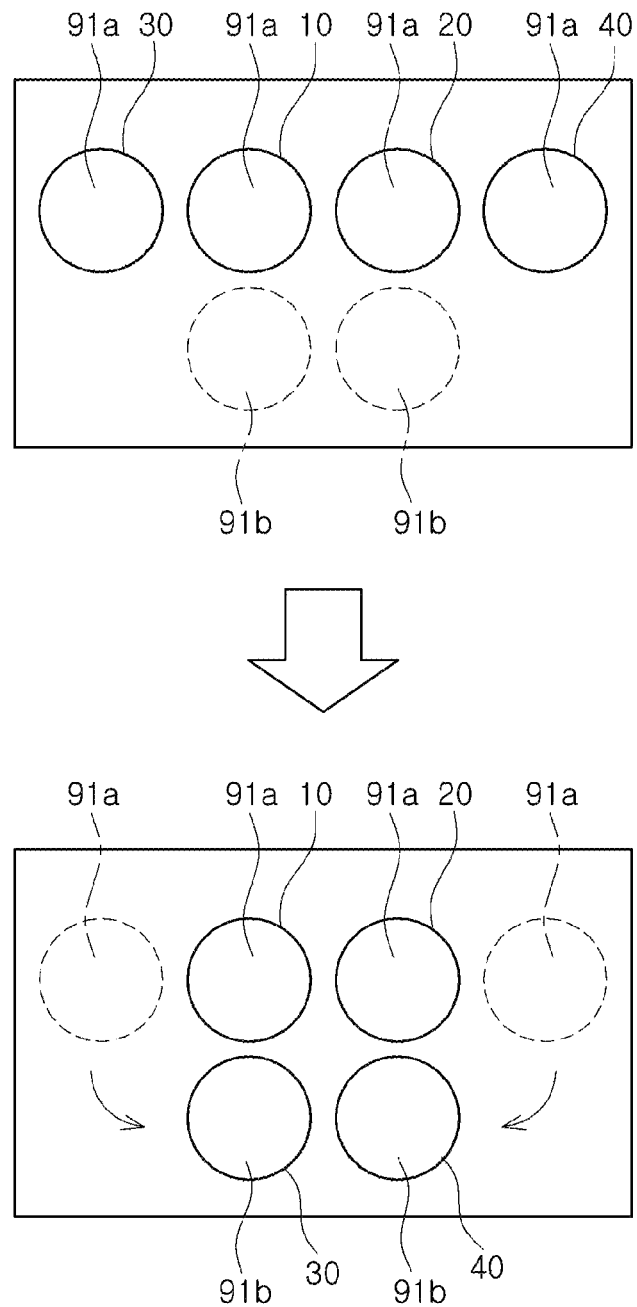
FIGS. 16 to 18 are views illustrating various imaging methods of a camera module, according to an embodiment.
Figure 17:
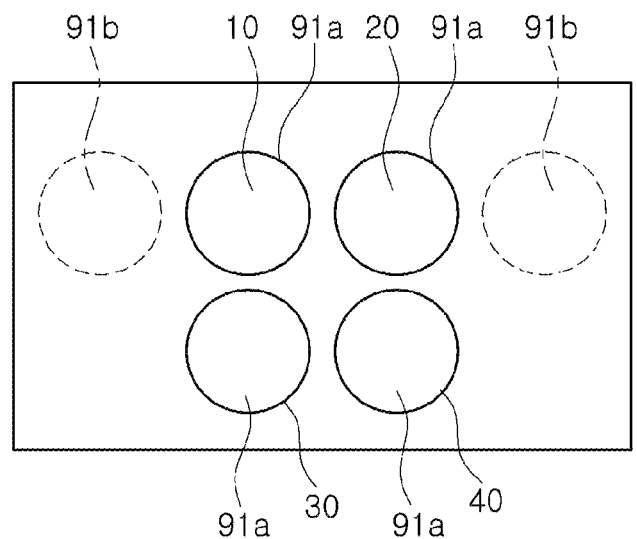
Figure 17:
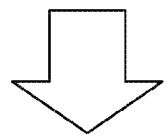
Figure 17:
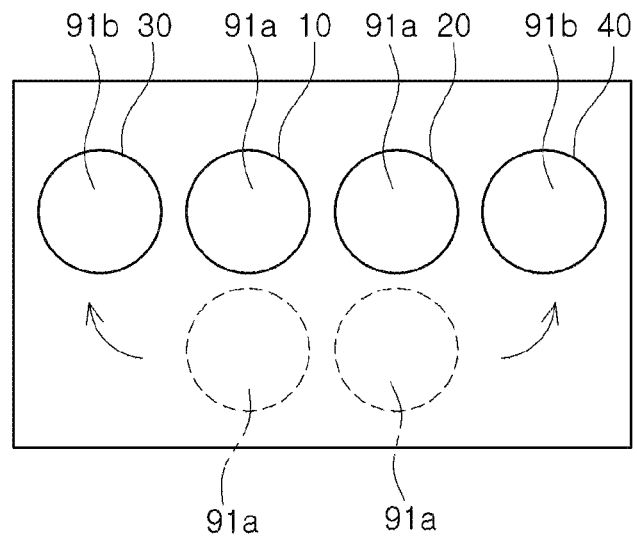
Figure 18:
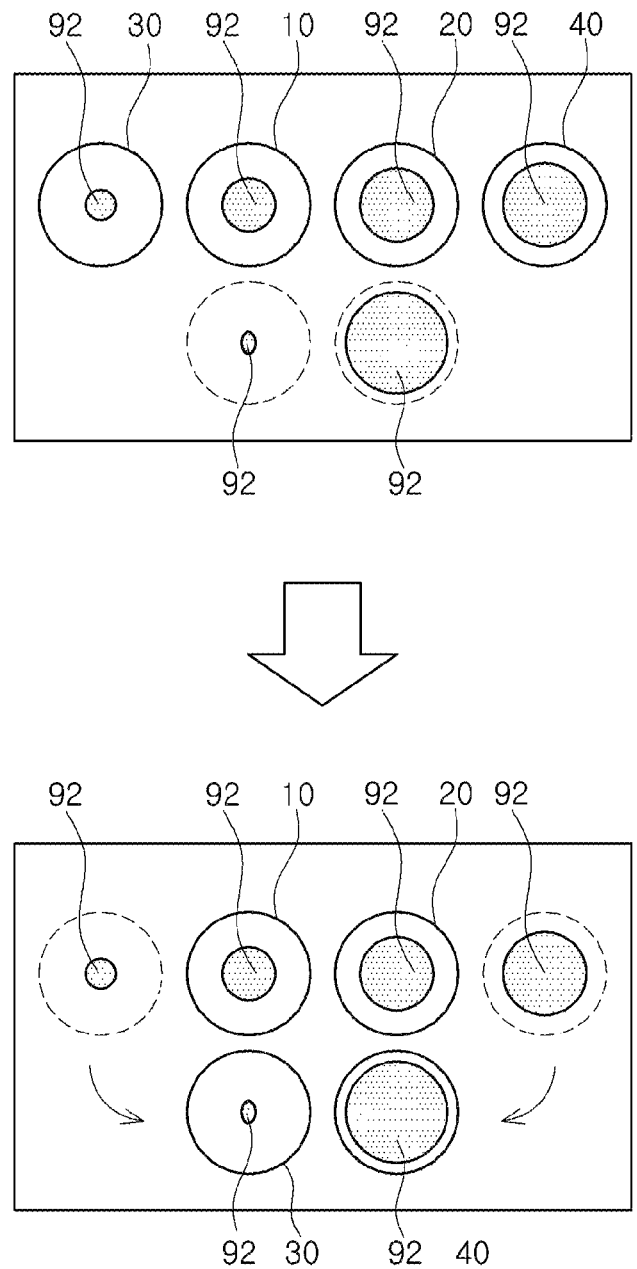

FIGS. 16 to 18 are views illustrating various imaging methods of a camera module, according to an example embodiment.

In FIGS. 16 to 18, the first camera 10, the second camera 20, the third camera 30, and the fourth camera 40 are illustrated in a schematic manner for ease of description.

Referring to FIG. 16, the diagram at an upper portion of FIG. 16 illustrates an example in which the first to fourth cameras 10, 20, 30, and 40 are disposed in a first configuration in which the first and second cameras 10 and 20 are disposed in respective fixed positions, and the third and fourth cameras 30 and 40 are disposed in respective first positions. The diagram at a lower portion of FIG. 16 illustrates an example in which the first to fourth cameras 10, 20, 30, and 40 are disposed in a second configuration in which the first camera 10 and the second camera 20 are disposed in the respective fixed positions, and the third camera 30 and the fourth camera 40 are disposed in the respective second positions.

Alternatively, the third camera 30 and the fourth camera 40 may also be disposed in any number of respective intermediate positions between the respective first positions and the respective second positions, according to an imaging method.

When the first to fourth cameras 10, 20, 30, and 40 are disposed in the first configuration, a distance between the third camera 30 and the fourth camera 40 may be relatively great. Accordingly, a stereoscopic image may be obtained using the third camera 30 and the fourth camera 40.

The first camera 10 and the second camera 20, which are disposed in the respective fixed positions may be used to obtain a general image (an image blocking infrared rays). Thus, infrared blocking filters 91a may be provided on the cover glass 90 in positions corresponding to respective fixed positions of the first camera 10 and the second camera 20, and the respective first positions of the third camera 30 and the fourth camera 40.

When the first camera 10 and the second camera 20 are disposed in the respective fixed positions, and the third camera 30 and the fourth camera 40 are disposed in the respective second positions, a distance between the third camera 30 and the fourth camera 40 may be relatively short. Accordingly, the third camera 30 and the fourth camera 40 may be used to obtain a general image.

The third camera 30 and the fourth camera 40, when disposed in the respective second positions (corresponding to the second configuration), may be used to obtain an infrared image (an image passing infrared rays). Accordingly, infrared passing filters 91b may be provided on the cover glass 90 in positions corresponding to the respective second positions of the third camera 30 and the fourth camera 40.

Referring to FIG. 17, the first, to fourth cameras 10, 20, 30, and 40 may be configured to have different fields of view. As an example, the first camera 10 may have a widest field of view (wide-angle), the second camera 20 may have a field of view narrower than a field of view of the first camera 10, and each of the third camera 30 and the fourth camera 40 may have a field of view narrower than a field of view of the second camera 20. One of the third camera 30 and the fourth camera 40 may have a field of view narrower than a field of view of the other of the third camera 30 and the fourth camera 40.

The first camera 10 and the second camera 20, which are disposed in the respective fixed positions may be used to obtain a general image. In this case, a zooming effect may be implemented using the first camera 10 and the second camera 20.

For example, when an object with a relatively wide range is imaged, the object may be imaged using the first camera 10. When an object with a relatively narrow range is imaged, the object may be imaged using the second camera 20.

A zooming effect may be substantially implemented by conversion between the first camera 10 and the second camera 20 in a section from a wide-angle to a telephoto.

The third camera 30 and the fourth camera 40, when disposed in the respective first positions, may be used to obtain an infrared image. Accordingly, the infrared passing filters 91b may be provided on the cover glass 90 in positions corresponding to the respective first positions of the third camera 30 and the fourth camera 40.

The infrared blocking filters 91a may be provided on the cover glass 90 in positions corresponding to the respective second positions of the third camera 30 and the fourth camera 40. Accordingly, the third camera 30 and the fourth camera 40, when disposed in the respective second positions, may be used to obtain a general image.

When the third camera 30 and the fourth camera 40 are disposed in the respective second positions (corresponding to the second configuration), the first to fourth cameras 10, 20, 30, and 40 may be disposed adjacent to one another. Since the first to fourth cameras 10, 20, 30, and 40 have different fields of view, an improved zooming effect may be implemented using the first to fourth cameras 10, 20, 30, and 40.

For example, when an object with a widest range is imaged, the object may be imaged by the first camera 10, when an object with a narrower range is imaged, the object may be imaged by the second camera 20, when an object with an even narrower range is imaged, the object may be imaged by the third camera 30, and when an object with a narrowest range is imaged, the object may be imaged by the fourth camera 40.

Accordingly, an improved zooming effect may be implemented by conversion among the first to fourth cameras 10 to 40 in a section from a wide-angle to a telephoto.

Referring to FIG. 18, a plurality of stops 92 may be disposed on the cover glass 90. For example, the stops 92 which may have different diameters according to positions of the cameras 10, 20, 30, and 40 may be provided on the cover glass 90.

The stops 92 corresponding to the respective fixed positions of the first camera 10 and the second camera 20 and the respective first positions of the third camera 30 and the fourth camera 40 may have different diameters.

Diameters of the stops 92 corresponding to the respective second positions of the third camera 30 and the fourth camera 40 may be different from a diameter of the stops 92 corresponding to the respective first positions of the third camera 30 and the fourth camera 40.

Accordingly, the first to fourth cameras 10, 20, 30, and 40 may have different F-numbers according to positions thereof.

In FIGS. 16 to 18, the infrared blocking filters 91a, the infrared passing filters 91b, and the stops 92 may be provided on the cover glass 90, but the disclosure is not limited to such an embodiment. The infrared blocking filters 91a, the infrared passing filters 91b, and the stops 92 may also be provided on the cover 300.

Although not illustrated, each of the first to fourth cameras 10, 20, 30, and 40 may be divided into a lens unit and an image sensor unit.

When the cameras 10, 20, 30, and 40 move, only one of the lens unit and the image sensor unit may move, and a different lens unit or a different image sensor unit may be disposed in a position in which the movement of the cameras 10, 20, 30, and 40 is completed, such that the cameras 10, 20, 30, and 40 may have various fields of view according to positions of the cameras 10, 20, 30, and 40.

A fingerprint sensor, a pulse sensor, a wide-angle, and/or the like, may be fixed to and disposed in a region below the third camera 30 and the fourth camera 40. Accordingly, when the third camera 30 and the fourth camera 40 move from the respective first positions to the respective second positions (or vice versa), an empty space may be used for recognition of a fingerprint and/or checking a pulse.

Imaging methods of the camera modules described in the aforementioned embodiments are merely examples, and various combinations thereof may be made.

According to the aforementioned embodiments, a camera module and a portable electronic device including a camera module may change positions of a portion of a plurality of cameras such that an object may be imaged by various methods.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. In addition, respective embodiments may be combined with each other. For example, the pressing members disclosed in the above-described embodiments may be used in combination with each other in one force sensing device. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a base plate; and
a plurality of cameras disposed on the base plate and spaced apart from one another,
wherein the plurality of cameras comprise:
fixed cameras that are immovable with respect to the base plate; and
movable cameras that are each configured to move with respect to the base plate and rotate around a fixed camera among the fixed cameras.

2. The camera module of claim 1, wherein the movable cameras are each further configured to move such that a distance between the movable cameras increases or decreases.

3. The camera module of claim 1, wherein the movable cameras are each further configured to move between a respective first position and a respective second position, and
wherein the respective first position is a position in which centers of all of the plurality of cameras are linearly aligned, and the respective second position is a position in which a path connecting centers of adjacent cameras among the plurality of cameras forms a quadrangular shape.

4. The camera module of claim 1, wherein the fixed cameras include a first camera and a second camera, and the movable cameras include a third camera and a fourth camera, and
wherein the third camera is disposed adjacent to the first camera, and the fourth camera is disposed adjacent to the second camera.

5. The camera module of claim 4, wherein the base plate includes guide holes penetrating the base plate and configured to be arc-shaped,
wherein each of the third camera and the fourth camera includes a protrusion disposed in a corresponding guide hole among the guide holes, and
wherein the third camera is configured to rotate around the first camera, and the fourth camera is configured to rotate around the second camera.

6. The camera module of claim 5, wherein the base plate further includes guide rails spaced apart from the guide holes and configured to be arc-shaped, and
wherein each of the third camera and the fourth camera further includes a guide projection disposed in a corresponding guide rail among the guide rails.

7. The camera module of claim 6, wherein a curvature of each of the guide holes is different from a curvature of each of the guide rails.

8. The camera module of claim 7, wherein each of the third camera and the fourth camera further includes an image sensor having a rectangular shape,
wherein each of the third camera and the fourth camera is movable such that a long side of the image sensor in the respective first position is parallel to a long side of the image sensor in the respective second position, and
wherein the respective first position is a position in which centers of the first to fourth cameras are linearly aligned, and the respective second position is a position in which a path connecting centers of adjacent cameras among the first to fourth cameras forms a quadrangular shape.

9. The camera module of claim 6, wherein a curvature of each of the guide holes is the same as a curvature of each of the guide rails.

10. The camera module of claim 9, wherein each of the third camera and the fourth camera further includes an image sensor having a rectangular shape,
- wherein each of the third camera and the fourth camera is movable such that a long side of the image sensor in the respective first position is perpendicular to a long side of the image sensor in the respective second position, and
- wherein the respective first position is a position in which centers of the first to fourth cameras are linearly aligned, and the respective second position is a position in which a path connecting centers of adjacent cameras among the first to fourth cameras forms a quadrangular shape.

11. The camera module of claim 4, wherein the first camera and the third camera are connected to each other by a first link member, and
- wherein the second camera and the fourth camera are connected to each other by a second link member.

12. The camera module of claim 11, wherein the base plate includes a driver comprising a rotating shaft, a first gear, and a second gear,
- wherein the first gear is configured to rotate while engaged with the rotating shaft, and the second gear is configured to rotate while engaged with the first gear, and
- wherein one end of the first link member is engaged with the first gear, and one end of the second link member is engaged with the second gear.

13. A electronic device, comprising:
- a case and a cover coupled to each other, and forming an internal space; and
- a camera module disposed in the internal space, wherein the camera module comprises:
  - a base plate; and
  - a first camera, a second camera, a third camera, and a fourth camera spaced apart from one another,
- wherein the first camera and the second camera are fixed to the base plate and immovable with respect to the base plate,
- wherein the third camera is configured to move with respect to the base plate and rotate around the first camera, and
- wherein the fourth camera is configured to move with respect to the base plate and rotate around the second camera.

14. The electronic device of claim 13, wherein the first camera, the second camera, the third camera, and the fourth camera are configured to have different fields of view.

15. The electronic device of claim 13, further comprising:
- infrared blocking filters disposed on the cover in positions corresponding to fixed positions of the first and second cameras and respective first positions of the third and fourth cameras; and
- infrared passing filters disposed on the cover in positions corresponding to respective second positions of the third and fourth cameras,
- wherein the respective first positions are positions in which centers of the first to fourth cameras are linearly aligned, and the respective second positions are positions in which a path connecting centers of adjacent cameras among the first to fourth cameras forms a quadrangular shape.

16. The electronic device of claim 13, wherein the cover includes:
- first stops disposed in positions corresponding to fixed positions of the first and second cameras and respective first positions of the third and fourth cameras; and
- second stops disposed in positions corresponding to respective second positions of the third and fourth cameras,
- wherein diameters of the first stops are different from each other, and diameters of the second stops are different from the diameters of the first stops, and
- wherein the respective first positions are positions in which centers of the first to fourth cameras are linearly aligned, and the respective second positions are positions in which a path connecting centers of adjacent cameras among the first to fourth cameras forms a quadrangular shape.

17. The electronic device of claim 13, wherein the base plate comprises guide holes having a curved shape, and
- wherein the third and fourth cameras each comprise a protrusion disposed in a respective guide hole among the guide holes.

18. The electronic device of claim 13, wherein the third camera is connected to the first camera by a first link member, and the fourth camera is connected to the second camera by a second link member.

\* \* \* \* \*